J. GARRY.

Improvement in Car Roofs.

No. 5,147.

Reissued Nov. 19, 1872.

Witnesses.

J. C. Bingham.

A. J. Cornell

Inventor.

J. Garry.

Per. Burridge & Co.

Attys. Cleveland. O.

UNITED STATES PATENT OFFICE.

JOHN GARRY, OF CLEVELAND, OHIO, ASSIGNOR TO GARRY IRON-ROOFING COMPANY.

IMPROVEMENT IN CAR-ROOFS.

Specification forming part of Letters Patent No. 108,130, dated October 11, 1870; reissue No. 5,147, dated November 19, 1872.

*To all whom it may concern:*

Figure 1:
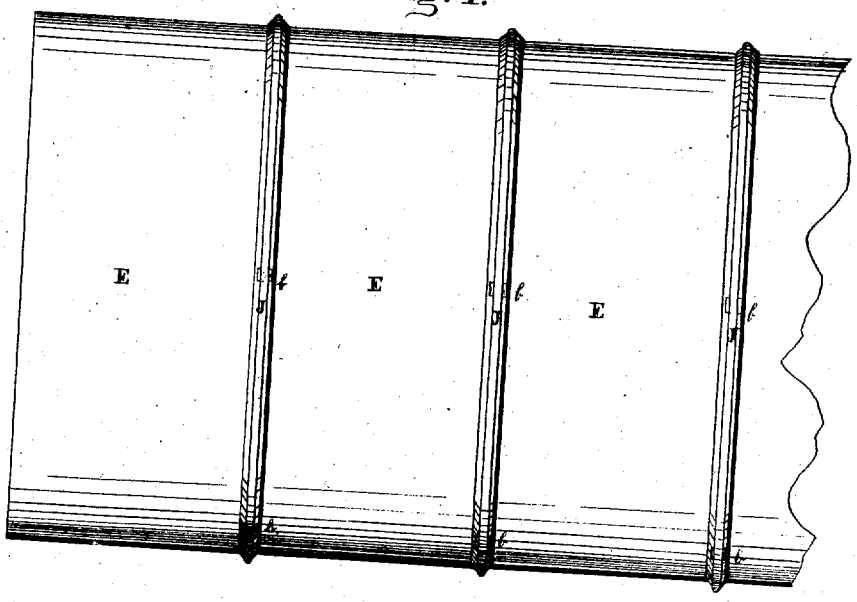
Figure 2:
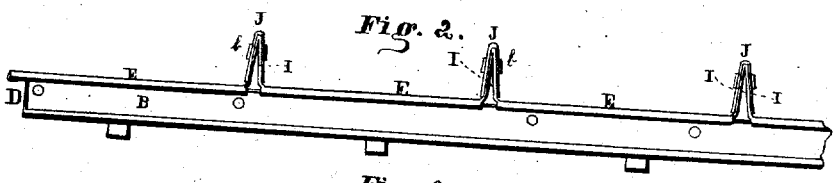
Figure 3:
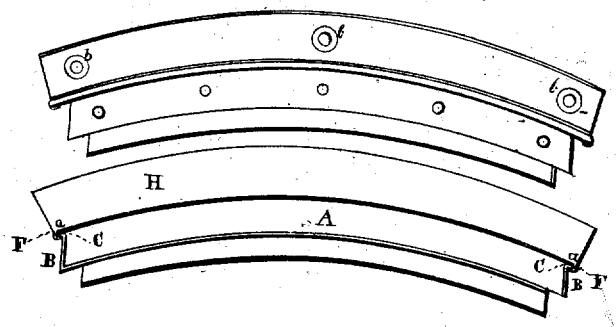

Be it known that I, JOHN GARRY, of Cleveland, in the county of Cuyahoga and State of Ohio, have invented certain new and useful Improvements in Metallic Roofing, of which the following is a description:

Figure 1 is a top view of the car-roofing; Fig. 2, a view of the eaves. Figs. 3 and 4 are end views.

Like letters of reference refer to like parts in the different views.

The nature of this invention relates to metallic roofing composed of sheets with flanges and caps so arranged that the same are firmly fastened together and secured by flanges to the eaves and ends of the roof, to which the edges of the sheets are locked, substantially as hereinafter described.

In the drawing, Fig. 4, A represents the uncovered end of a car-roof, which is constructed of wood in the ordinary way, and of the usual shape, along the eaves of which is secured a strip of metal, B, Fig. 2, having its upper edge turned outwardly at an angle, forming a projecting flange, C, Fig. 4, which represents an end view of the strips referred to. To the ends of the roof is also secured a similar strip, D, Fig. 2, having a projecting flange in like manner, to which and to the strips along the eaves the sheets of roofing E, Fig. 1, are attached, as follows: The several sheets to be laid upon the roof are cut of a length a little more than that of the width of the roof, so that the ends of the roofing or sheets may extend beyond the edge of the projecting flange of the strips B. The extending ends of the sheets are then turned down under the flange, which it embraces, forming a lock-joint, as shown at *a*, Fig. 4. It will be obvious that by this means the sheets are held closely down upon the roof, without nails or other fastenings, in a strong and durable manner. The sheets are secured in like manner to the ends of the roof, a strip, H, Fig. 3, and flange being nailed thereto, and the edge of the roofing turned under the flange, embracing and forming a lock substantially the same. The several sheets composing the roofing are connected to each other by a wide upturned flange, I, which are approximated and thus secured by a cap, J, placed on or over the two upturned flanges, thereby locking them securely together and excluding the rain and snow from between them. The cap is secured to the flanges by eyelets or rivets *b* inserted in holes punched through the cap and flanges, thereby riveting the flanges together in a neat, easy, and durable manner.

It will be observed that the flanges do not touch each other at their base or angle, but only at the top. The open space between the flanges allows the sheets to contract and expand as they may be affected by the vicissitudes of the weather. Hence, no injurious strain can be exerted upon them to cause them to wrinkle and tear loose from their fastenings.

Roofing thus attached to the roof can be removed therefrom entire by unlocking the lap from the flange of one end and then sliding the connected sheets endwise from the roof; or one section or more may be removed singly without disturbing the rest by unlocking the lap from the flange at the eaves and removing the eyelets and cap. This being done, a section can be drawn transversely from the roof without injuring or disturbing those on either side.

This roof may be used upon either car or building.

What I claim as my invention, and desire to secure by Letters Patent, is—

A roof composed of metallic sheets, with flanges I and caps J fastened together by eyelets or rivets *b* and secured to the structure for supporting said roof, in the manner and for the purpose substantially set forth.

JOHN GARRY.

Witnesses:

JOHN H. BURRIDGE,

A. F. CORNELL.